(12) United States Patent
Lee

(10) Patent No.: US 12,061,565 B2
(45) Date of Patent: Aug. 13, 2024

(54) METHOD FOR READING INFORMATION FROM RISER CARDS AND BASEBOARD MANAGEMENT CONTROL MODULE IMPLEMENTING THE SAME

(71) Applicant: Mitac Computing Technology Corporation, Taoyuan (TW)

(72) Inventor: Chih-Wei Lee, Taoyuan (TW)

(73) Assignee: Mitac Computing Technology Corporation, Taoyuan (TW)

( * ) Notice: Subject to any disclaimer, the term of this patent is extended or adjusted under 35 U.S.C. 154(b) by 41 days.

(21) Appl. No.: 18/184,506

(22) Filed: Mar. 15, 2023

(65) Prior Publication Data

US 2024/0070105 A1    Feb. 29, 2024

(30) Foreign Application Priority Data

Aug. 30, 2022   (TW) .................................. 111132645

(51) Int. Cl.
*G06F 13/40*    (2006.01)
*G06F 1/18*     (2006.01)

(52) U.S. Cl.
CPC ............ *G06F 13/409* (2013.01); *G06F 1/185* (2013.01)

(58) Field of Classification Search
CPC ......... G06F 13/409; G06F 1/185; G06F 13/42
See application file for complete search history.

(56) References Cited

U.S. PATENT DOCUMENTS

| 7,673,290 B1 * | 3/2010 | Kothandapani ..... G06F 11/3065 |
| | | 717/121 |
| 11,604,745 B1 * | 3/2023 | Lambert ............. G06F 13/1689 |
| 2004/0163019 A1 * | 8/2004 | Elfering ............. G06F 11/1008 |
| | | 714/E11.034 |
| 2008/0065798 A1 * | 3/2008 | Lu ........................ G06F 9/4411 |
| | | 710/301 |

(Continued)

FOREIGN PATENT DOCUMENTS

| CN | 101192168 A | 6/2008 |
| CN | 106557340 A | 4/2017 |

OTHER PUBLICATIONS

Search Report appended to an Office Action, which was issued to Taiwanese counterpart application No. 111132645 by the TIPO on Mar. 20, 2023, with an English translation thereof.

*Primary Examiner* — Phong H Dang
(74) *Attorney, Agent, or Firm* — MLO, a professional corp.

(57) ABSTRACT

A method for reading information from multiple riser cards is implemented by a BMC module that includes an SMBus controller, where the riser cards are electrically connected to the SMBus controller. The method includes steps of: accessing a lookup table and a plurality of bus addresses; scanning a target address for communicating with a target card; determining whether a slave address has been received from the target card; when the BMC module determines that the slave address has been received from the target card, reading a memory of the target card according to a target reading spec to obtain identification information; determining whether the identification information conforms to an FRU header format; and when the BMC module determines that the identification information conforms to the FRU header format, reading the memory of the target card to obtain FRU information.

20 Claims, 3 Drawing Sheets

(56) References Cited

U.S. PATENT DOCUMENTS

| | | | | |
|---|---|---|---|---|
| 2010/0306357 A1* | 12/2010 | Chen | ............... | H04L 43/00 |
| | | | | 713/1 |
| 2015/0046761 A1* | 2/2015 | Messer | ............ | G06F 11/00 |
| | | | | 714/710 |
| 2023/0350823 A1* | 11/2023 | Leyendecker | ...... | G06F 13/20 |

* cited by examiner

METHOD FOR READING INFORMATION FROM RISER CARDS AND BASEBOARD MANAGEMENT CONTROL MODULE IMPLEMENTING THE SAME

CROSS-REFERENCE TO RELATED APPLICATION

This application claims priority to Taiwanese Invention Patent Application No. 111132645, filed on Aug. 30, 2022.

FIELD

The disclosure relates to a method for reading information from multiple riser cards and a baseboard management control module implementing the same.

BACKGROUND

A conventional baseboard management control (BMC) module in a computer is configured to read field replaceable unit (FRU) information from a peripheral component interconnect express (PCIe) riser card that conforms to a specific specification. When another PCIe riser card that conforms to a different specification is installed in the computer, the BMC module may fail to read the FRU information from that PCIe riser card. That is to say, the BMC module may be unable to dynamically support reading information from multiple PCIe riser cards that conform to different specifications, and programmers from related manufacturers may need to design a new BMC module for that PCIe riser card.

SUMMARY

Therefore, an object of the disclosure is to provide a method for reading information from multiple riser cards and a baseboard management control module implementing the method. The method can alleviate at least one of the drawbacks of the prior art.

According to the disclosure, the method for reading information from multiple riser cards is implemented by a baseboard management control (BMC) module that includes a system management bus (SMBus) controller. Each of the riser cards is electrically connected to the SMBus controller via a respective one of a plurality of connection buses, and the SMBus controller communicates with each of the riser cards using a connection protocol. The method includes steps of: accessing a lookup table and a plurality of bus addresses by the BMC module, where the lookup table includes a plurality of reading specifications respectively for a plurality of default riser card types, and each of the bus addresses corresponds to a respective one of the connection buses; scanning a target address by the BMC module for communicating with a target card, where the target address is determined to be one of the bus addresses selected by the BMC module, and the target card is one of the riser cards that is electrically connected to one of the connection buses corresponding to the target address; determining whether a slave address has been received from the target card by the BMC module; when the BMC module determines that the slave address has been received from the target card, reading a memory of the target card by the BMC module according to a target reading spec to obtain identification information, where the target reading spec is determined to be one of the reading specifications selected by the BMC module from the lookup table; determining whether the identification information conforms to a field replaceable unit (FRU) header format by the BMC module; and when the BMC module determines that the identification information conforms to the FRU header format, reading the memory of the target card by the BMC module according to the target reading spec to obtain FRU information.

According to the disclosure, the baseboard management control (BMC) module configured to read information from multiple riser cards includes a system management bus (SMBus) controller, a storage medium, and a BMC unit. The SMBus controller is electrically connected to each of the riser cards via a respective one of a plurality of connection buses, and is configured to communicate with each of the riser cards using a connection protocol. The storage medium is configured to store a lookup table and a plurality of bus addresses. The lookup table includes a plurality of reading specifications respectively for a plurality of default riser card types, and each of the bus addresses corresponds to a respective one of the connection buses. The BMC unit is electrically connected to the storage medium for reading the lookup table and the bus addresses, and is further electrically connected to the SMBus controller for reading each of the riser cards. The BMC unit is configured to scan a target address for communicating with a target card, and is further configured to determine whether a slave address has been received from the target card. The target address is determined to be one of the bus addresses selected by the BMC unit, and the target card is one of the riser cards that is electrically connected to one of the connection buses corresponding to the target address. The BMC unit is further configured to, when the BMC unit determines that the slave address has been received from the target card, read a memory of the target card according to a target reading spec to obtain identification information. The target reading spec is determined to be one of the reading specifications selected by the BMC unit from the lookup table. The BMC unit is further configured to determine whether the identification information conforms to a field replaceable unit (FRU) header format, and is further configured to, when the BMC unit determines that the identification information conforms to the FRU header format, read the memory of the target card according to the target reading spec to obtain FRU information.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
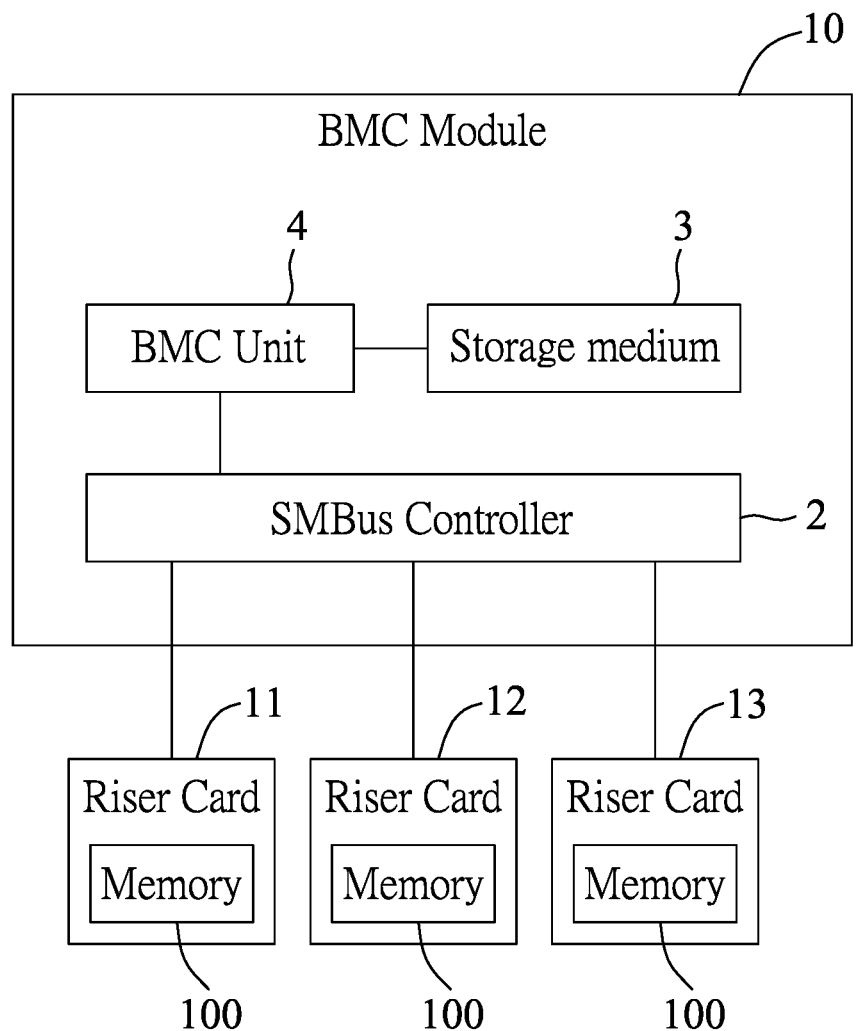
FIG. 1 is a block diagram illustrating a baseboard management control module according to an embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, a baseboard management control (BMC) module 10 according to an embodiment of the disclosure is adapted for a computer (not shown). The BMC module 10 is configured to read information from multiple riser cards 11-13 that have the same specification or that conform to different specifications. It should be noted that FIG. 1 uses three riser cards as an example, but the number of riser cards is not limited to three. In this embodiment, each of the riser cards 11-13 is a peripheral component interconnect express (PCIe) riser card. The BMC module 10 includes a system management bus (SMBus) controller 2, a storage medium 3, and a BMC unit 4. In some embodiments, the storage medium 3 is not integrated in the BMC module 10, and the BMC module 10 is electrically connected to the storage medium 3 for reading information therein. It should be noted that the BMC module 10 may be implemented by any device/controller that has a function of the SMBus controller 2. The storage medium 3 may be embodied using computer-readable storage medium such as hard disk drive (s), random access memory (RAM), read only memory (ROM), programmable ROM (PROM), firmware, flash memory, etc.

Each of the riser cards 11-13 is electrically connected to the SMBus controller 2 via a respective one of a plurality of connection buses, and the SMBus controller 2 communicates with each of the riser cards 11-13 using a connection protocol. It should be noted that each of the connection buses may be an inter-integrated circuit (I2C) bus or an SMBus, and the connection protocol may be an I20 protocol or an SMBus protocol. In this embodiment, the connection protocol is the I2C protocol.

The storage medium 3 stores a lookup table and a plurality of bus addresses. The lookup table includes a plurality of reading specifications respectively for a plurality of default riser card types that respectively adopt a plurality of default memory formats. In this embodiment, the riser cards 11-13 corresponds to different default riser card types, respectively, but this disclosure is not limited to such. Each of the bus addresses corresponds to a respective one of the connection buses, meaning that each of the bus addresses may be used for communicating with a respective one of a plurality of ports of the SMBus controller 2.

Each of the reading specifications includes a data unit per reading operation, a data offset position, and a header size (i.e., a memory size occupied by a header data). In this embodiment, the data unit per reading operation is related to a unit length used for reading information of a riser card of a corresponding default riser card type, where the unit length may be one byte, two bytes, or other memory lengths. The data offset position is related to an offset shift needed for reading information from a riser card of a corresponding default riser card type.

The data unit per reading operation and the data offset position of each one of the reading specifications may vary with different default memory formats. In some cases, some of the default memory formats may have identical data unit per reading operation but different data offset position; in some cases, some of the default memory formats may have identical data offset position but different data unit per reading operation; and in some cases, each of the default memory formats may have different data unit per reading operation and different data offset position.

The BMC unit 4 is electrically connected to the storage medium 3 for reading the lookup table and the bus addresses, and is further electrically connected to the SMBus controller 2 for reading each of the riser cards 11-13. For example, the BMC unit 4 may control the SMBus controller 2 to read from the riser cards 11-13 by polling (namely, one by one in an order) so that the BMC unit 4 may indirectly access and read from each of the riser cards 11-13 according to the lookup table and the bus addresses.

Figure 2:
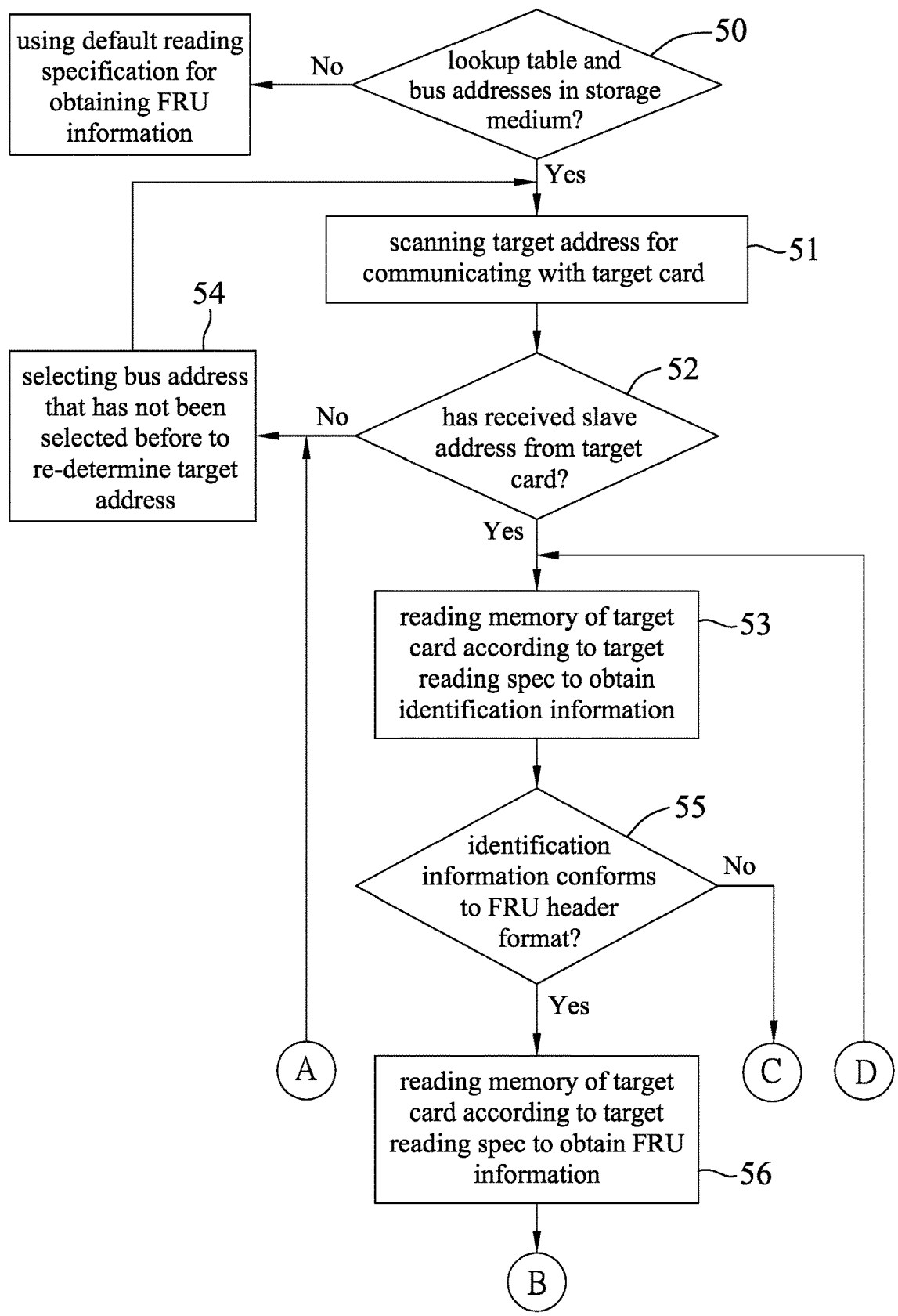
FIG. 2 and FIG. 3 cooperatively provide a flow chart illustrating a method for reading information from multiple riser cards according to an embodiment of the disclosure.
Figure 3:
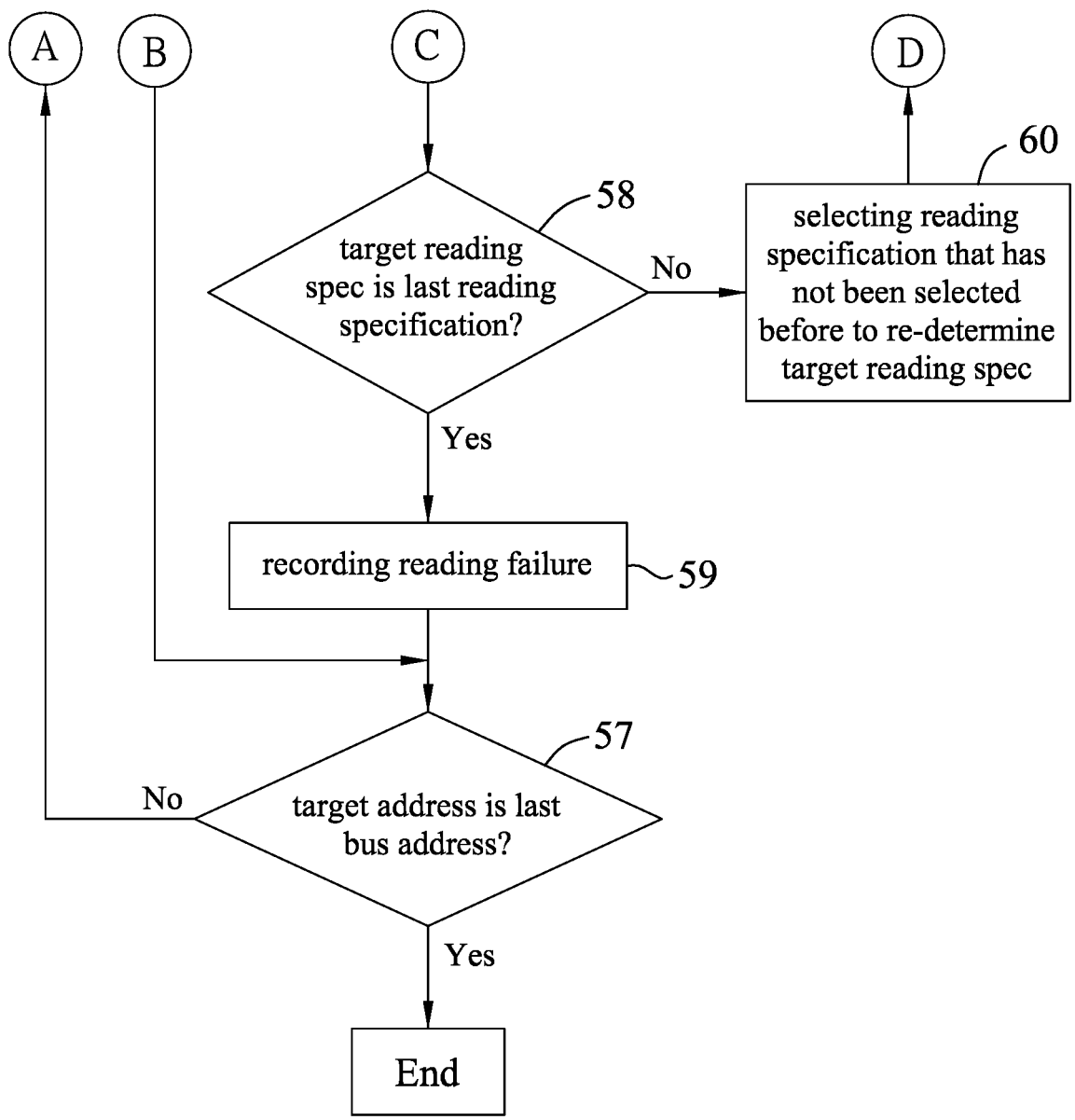

Further referring to FIGS. 2 and 3, the BMC module 10 may obtain field replaceable unit (FRU) information from the riser cards 11-13 by implementing the method for reading information from multiple riser cards. The method includes steps 50 to 60.

In step 50, the BMC module 10 checks whether the storage medium 3 stores the lookup table and the bus addresses. If it is determined that the storage medium 3 stores the lookup table and the bus addresses, the BMC module 10 accesses the lookup table and the bus addresses from the storage medium 3, and the flow proceeds to step 51. Otherwise, if it is determined that the storage medium 3 does not store the lookup table and the bus addresses, a default reading specification for a default type of riser card may be used by the BMC module 10 for obtaining FRU information from the riser cards 11-13.

In step 51, the BMC module 10 scans a target address for, when one of the riser cards 11-13 is electrically connected to one of the connection buses corresponding to the target address, communicating with the one of the riser cards 11-13 (referred to as a target card hereinafter), where the target address is determined to be one of the bus addresses selected by the BMC module 10.

In step 52, the BMC module 10 determines whether a slave address has been received from the target card. If affirmative, the flow proceeds to step 53; otherwise, the flow proceeds to step 54.

It should be noted that, in this embodiment, if the BMC module 10 is able to receive the slave address from the target card, it means that the target card supports the I2C protocol, and the one of the connection buses that the target card is connected to may be considered as the I2C bus. It should be further noted that, according to the I2C protocol, when a master device accesses a slave device, the slave device (e.g., a riser card, a backplane, or any bridge circuit board that may be used to connect a motherboard to a hard drive or a peripheral device) is configured to send back a message to the master device, where the message includes the slave address of the slave device. Therefore, in this embodiment, the target card is configured to, if the target card supports the I2C protocol, send the slave address to the BMC module 10 when being accessed by the BMC module 10.

In step 53, the BMC module 10 reads a memory 100 of the target card according to a target reading spec to obtain identification information from the target card. The target reading spec is determined to be one of the reading specifications selected by the BMC module 10 from the lookup table. In this embodiment, the memory 100 of the target card may be an electrically-erasable programmable read-only memory (EEPROM).

In step 54, the BMC module 10 selects one of the bus addresses that has not been selected before (i.e., one of the bus addresses that has not been used in step 51 yet) to re-determine the target address and thus the target card. In this embodiment, the BMC module 10 selects one of the bus addresses that has not been selected before to replace the target address that was used in step 51, and the flow returns to step 51 for the BMC module 10 to scan the target address thus replaced in step 54.

In this embodiment, the bus addresses are arranged in a first listed order in the lookup table, where the BMC module 10 determines the target address by selecting the bus addresses one by one in the first listed order, starting from a first bus address in the first listed order. Therefore, the BMC module 10 selects a next one of the bus addresses to re-determine the target address according to the first listed order in step 54. In some embodiments, the BMC module 10 randomly selects one of the bus addresses among the bus addresses that have not been selected before to re-determine the target address in step 54.

In step 55, the BMC module 10 determines whether the identification information conforms to an FRU header format. If affirmative, the flow proceeds to step 56; otherwise, the flow proceeds to step 58. The BMC module 10 determines whether the identification information conforms to the FRU header format based on a default check sum that is stored in the storage medium 3. More specifically, the BMC module 10 compares a last byte of the identification information to the default check sum, and if the last byte of the identification information and the default check sum are identical to each other, then it is determined that the identification information conforms to the FRU header format; otherwise, it is determined that the identification information does not conform to the FRU header format. In this embodiment, the FRU header format is generated by the BMC module 10 according to an FRU spec and is pre-stored in the storage medium 3.

In step 56, the BMC module 10 reads the memory 100 of the target card according to the target reading spec to obtain FRU information that corresponds to the identification information obtained in step 53, so that the BMC module 10 may carry out a boot monitoring program accordingly. In this embodiment, the FRU information is related to information such as a product identification code, a product model, and a component manufacturer of the target card, and the corresponding identification information is an FRU header corresponding to the FRU information.

In step 57, the BMC module 10 determines whether the target address is a last one of the bus addresses. In other words, the BMC module 10 determines whether all the bus addresses have been scanned. If affirmative, the method is terminated; otherwise, the flow goes to step 54.

In this embodiment, the BMC module 10 marks the target address in the lookup table, and the BMC module 10 determines whether the target address is the last one of the bus addresses by determining whether all the bus addresses have been marked (namely, selected to be the target address before) in the lookup table. If all the bus addresses have been marked in the lookup table, it means that the target address is the last one of the bus addresses. In some embodiments where the BMC module determines the target address by selecting the bus addresses one by one in the first listed order, the BMC module 10 may determine whether the target address is the last one of the bus addresses by determining whether there is a next one of the bus addresses (i.e., another one of the bus addresses arranged after the target address) in the first listed order in the lookup table. If there is no more bus addresses after the target address in the first listed order, it means that the target address is the last one of the bus addresses.

In step 58, the BMC module 10 determines whether the target reading spec is a last one of the reading specifications. If affirmative, the flow proceeds to step 59; otherwise, the flow proceeds to step 60. In this embodiment, the BMC module 10 marks the target reading spec in the lookup table, and the BMC module 10 determines whether the target reading spec is the last one of the reading specifications by determining whether all the reading specifications have been marked (namely, selected to be the target reading spec before) in the lookup table. If all the reading specifications have been marked in the lookup table, it means that the target reading spec is the last one of the reading specifications. In some embodiments, the reading specifications are arranged in a second listed order in the lookup table, and the BMC module determines the target reading spec by selecting the reading specifications one by one in the second listed order, starting from a first reading specification in the second listed order. The BMC module 10 may determine whether the target reading spec is the last one of the reading specifications by determining whether there is a next one of the reading specifications (i.e., another one of the reading specifications arranged after the target reading spec) in the second listed order in the lookup table. If there is no more reading specifications after the target reading spec in the second listed order, it means that the target reading spec is the last one of the reading specifications.

In step 59, the BMC module 10 records a reading failure indicating that the BMC module 10 has failed to read the FRU information from the target card, and the flow proceeds to step 57.

In step 60, the BMC module 10 selects one of the reading specifications that has not been selected before to re-determine the target reading spec. In this embodiment, the BMC module 10 selects one of the reading specifications that has not been selected before to replace the target reading spec that was used in step 53, and the flow returns to step 53 for the BMC module 10 to read the identification information in the memory 100 of the target card according to the target reading spec thus replaced in step 60.

It should be noted that in this embodiment, in step 50, the lookup table and the bus addresses that are stored in the storage medium 3 are pre-written by product developers. After the computer is powered on, the BMC module 10 performs steps 51 to 60 during an initialization of the BMC module 10 for reading all of the inserted riser cards by turns. After the initialization of the BMC module 10, the BMC module 10 periodically performs steps 51 to 60 to scan through all of the connection addresses (i.e., all of the ports of the SMBus controller 2) for reading newly inserted riser cards if any.

In summary, the storage medium 3 stores the lookup table and the bus addresses so the BMC module 10 that implements the method according to the disclosure is able to read the FRU information from the riser cards 11-13 according to the reading specifications in the lookup table one after another. Accordingly, the method according to the disclosure is not limited to reading riser cards that conform to a specific specification (e.g., a specific memory format), and does not require a redesign of a firmware to be executed by the BMC module 10 to adapt for reading riser cards that have the same specification or that conform to different specifications. When a new type of riser card is being developed, the product developers may simply add a new reading specification that corresponds to the new type of riser card to the lookup table for the BMC module 10 to read the FRU information from the new type of riser card, without a need to replace the BMC module 10, or to re-compile and burn the firmware to be executed by the BMC module 10 (which may require a post-reboot that reduces a working efficiency of the computer), so as to reduce a cost and design complexity for the new type of riser card.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should be also appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for reading information from multiple riser cards, the method to be implemented by a baseboard management control (BMC) module that includes a system management bus (SMBus) controller, each of the riser cards being electrically connected to the SMBus controller via a respective one of a plurality of connection buses, the SMBus controller communicating with each of the riser cards using a connection protocol, the method comprising steps of:
    accessing a lookup table and a plurality of bus addresses by the BMC module, where the lookup table includes a plurality of reading specifications respectively for a plurality of default riser card types, and each of the bus addresses corresponds to a respective one of the connection buses;
    scanning a target address by the BMC module for communicating with a target card, where the target address is determined to be one of the bus addresses selected by the BMC module, and the target card is one of the riser cards that is electrically connected to one of the connection buses corresponding to the target address;
    determining whether a slave address has been received from the target card by the BMC module;
    when the BMC module determines that the slave address has been received from the target card, reading a memory of the target card by the BMC module according to a target reading spec to obtain identification information, where the target reading spec is determined to be one of the reading specifications selected by the BMC module from the lookup table;
    determining whether the identification information conforms to a field replaceable unit (FRU) header format by the BMC module; and
    when the BMC module determines that the identification information conforms to the FRU header format, reading the memory of the target card by the BMC module according to the target reading spec to obtain FRU information.

2. The method as claimed in claim 1, wherein each of the reading specifications includes a data unit per reading operation and a data offset position.

3. The method as claimed in claim 2, wherein the data unit per reading operation is related to a unit length used for reading information from the corresponding one of the riser cards, and the data offset position is related to an offset shift needed for reading information from the corresponding one of the riser cards.

4. The method as claimed in claim 2, wherein each of the reading specifications further includes a header size.

5. The method as claimed in claim 1, further comprising a step of, when the BMC module determines that the slave address has not been received from the target card, selecting one of the bus addresses that has not been selected before by the BMC module to re-determine the target address and thus the target card, and repeating the step of scanning the target address.

6. The method as claimed in claim 5, wherein the bus addresses are arranged in a listed order in the lookup table, and the BMC module determines the target address by selecting the bus addresses one by one in the listed order, starting from a first bus address in the listed order, wherein selecting one of the bus addresses that has not been selected before is to select a next one of the bus addresses according to the listed order.

7. The method as claimed in claim 5, wherein selecting one of the bus addresses that has not been selected before is to randomly select one of the bus addresses among the bus addresses that have not been selected before.

8. The method as claimed in claim 1, further comprising steps of,
    when the BMC module determines that the identification information does not conform to the FRU header format, determining whether the target reading spec is a last one of the reading specifications by the BMC module; and
    when the BMC module determines that the target reading spec is not the last one of the reading specifications, selecting one of the reading specifications that has not been selected before by the BMC module to re-determine the target reading spec, and repeating the step of reading the memory of the target card according to the target reading spec thus re-determined to obtain the identification information.

9. The method as claimed in claim 8, further comprising steps of,
    when the BMC module determines that the target reading spec is the last one of the reading specifications, recording a reading failure by the BMC module, the reading failure indicating that the BMC module has failed to read the FRU information from the target card;
    determining whether the target address is a last one of the bus addresses by the BMC module; and
    when the BMC module determines that the target address is not the last one of the bus addresses, selecting one of the bus addresses that has not been selected before by the BMC module to re-determine the target address, and repeating the step of scanning the target address.

10. The method as claimed in claim 9, further comprising a step of marking the target address in the lookup table by the BMC module, wherein determining whether the target address is the last one of the bus addresses is to determine whether all the bus addresses have been marked in the lookup table.

11. The method as claimed in claim 9, wherein the bus addresses are arranged in a listed order in the lookup table, and the BMC module determines the target address by selecting the bus addresses one by one in the listed order, starting from a first bus address in the listed order, wherein determining whether the target address is the last one of the bus addresses is based on whether there is a next one of the bus addresses in the listed order in the lookup table.

12. The method as claimed in claim 8, further comprising a step of marking the target reading spec in the lookup table, wherein determining whether the target reading spec is the last one of the reading specifications is to determine whether all the reading specifications have been marked in the lookup table.

13. The method as claimed in claim 8, wherein the reading specifications are arranged in a listed order in the lookup table, and the BMC module determines the target reading spec by selecting the reading specifications one by one in the listed order, starting from a first reading specification in the listed order, wherein determining whether the target reading spec is the last one of the reading specifications is based on whether there is a next one of the reading specifications in the listed order in the lookup table.

14. The method as claimed in claim 1, wherein determining whether the identification information conforms to the FRU header format is based on a default check sum.

15. The method as claimed in claim 1, wherein each of the connection buses is one of an inter-integrated circuit (I2C) bus and an SMBus, and the connection protocol is one of an 120 protocol and an SMBus protocol.

16. A baseboard management control (BMC) module configured to read information from multiple riser cards, comprising:
  a system management bus (SMBus) controller electrically connected to each of the riser cards via a respective one of a plurality of connection buses, said SMBus controller being configured to communicate with each of the riser cards using a connection protocol; and
  a BMC unit adapted to access a storage medium for reading a lookup table and a plurality of bus addresses that are stored in the storage medium, and electrically connected to said SMBus controller for reading each of the riser cards, where the lookup table includes a plurality of reading specifications respectively for a plurality of default riser card types, and each of the bus addresses corresponds to a respective one of said connection buses;
  wherein said BMC unit is configured to scan a target address for communicating with a target card, and being further configured to determine whether a slave address has been received from the target card, where the target address is determined to be one of the bus addresses selected by said BMC unit, and the target card is one of the riser cards that is electrically connected to one of said connection buses corresponding to the target address;
  wherein said BMC unit is further configured to, when said BMC unit determines that the slave address has been received from the target card, read a memory of the target card according to a target reading spec to obtain identification information, where the target reading spec is determined to be one of the reading specifications selected by said BMC unit from the lookup table, and said BMC unit is further configured to determine whether the identification information conforms to a field replaceable unit (FRU) header format; and
  said BMC unit is further configured to, when determining that the identification information conforms to the FRU header format, read the memory of the target card according to the target reading spec to obtain FRU information.

17. The BMC module as claimed in claim 16, wherein each of the reading specifications includes a data unit per reading operation and a data offset position.

18. The BMC module as claimed in claim 16, wherein said BMC unit is further configured to, when said BMC unit determines that the slave address has not been received from the target card, select one of the bus addresses that has not been selected before to re-determine the target address and thus the target card, and scan the target address thus re-determined to further determine whether the slave address has been received from the target card thus re-determined.

19. The BMC module as claimed in claim 16, wherein said BMC unit is further configured to, when said BMC unit determines that the identification information does not conform to the FRU header format, determine whether the target reading spec is a last one of the reading specifications;
  said BMC unit is further configured to, when said BMC unit determines that the target reading spec is not the last one of the reading specifications, select one of the reading specifications that has not been selected before to re-determine the target reading spec, read the memory of the target card according to the target reading spec thus re-determined to obtain the identification information, and said BMC unit is further configured to determine whether the identification information that was obtained by reading the memory of the target card according to the target reading spec thus re-determined conforms to the FRU header format; and
  said BMC unit is further configured to, when said BMC unit determines that the identification information that was obtained by reading the memory of the target card according to the target reading spec thus re-determined conforms to the FRU header format, read the memory of the target card according to the target reading spec to obtain the FRU information.

20. The BMC module as claimed in claim 19, wherein said BMC unit is further configured to, when said BMC unit determines that the target reading spec is the last one of the reading specifications, record a reading failure indicating that said BMC unit has failed to read the FRU information from the target card, and said BMC unit is further configured to determine whether the target address is a last one of the bus addresses; and
  said BMC unit is further configured to, when said BMC unit determines that the target address is not the last one of the bus addresses, select one of the bus addresses that has not been selected before to re-determine the target address and thus the target card, and scan the target address thus re-determined to further determine whether the slave address has been received from the target card thus re-determined.

* * * * *